Aug. 27, 1968  S. M. JORGENSEN  3,398,853
SHEAR STUD VESSEL CLOSURES AND SHELL JOINTS
Filed April 13, 1966  2 Sheets-Sheet 2
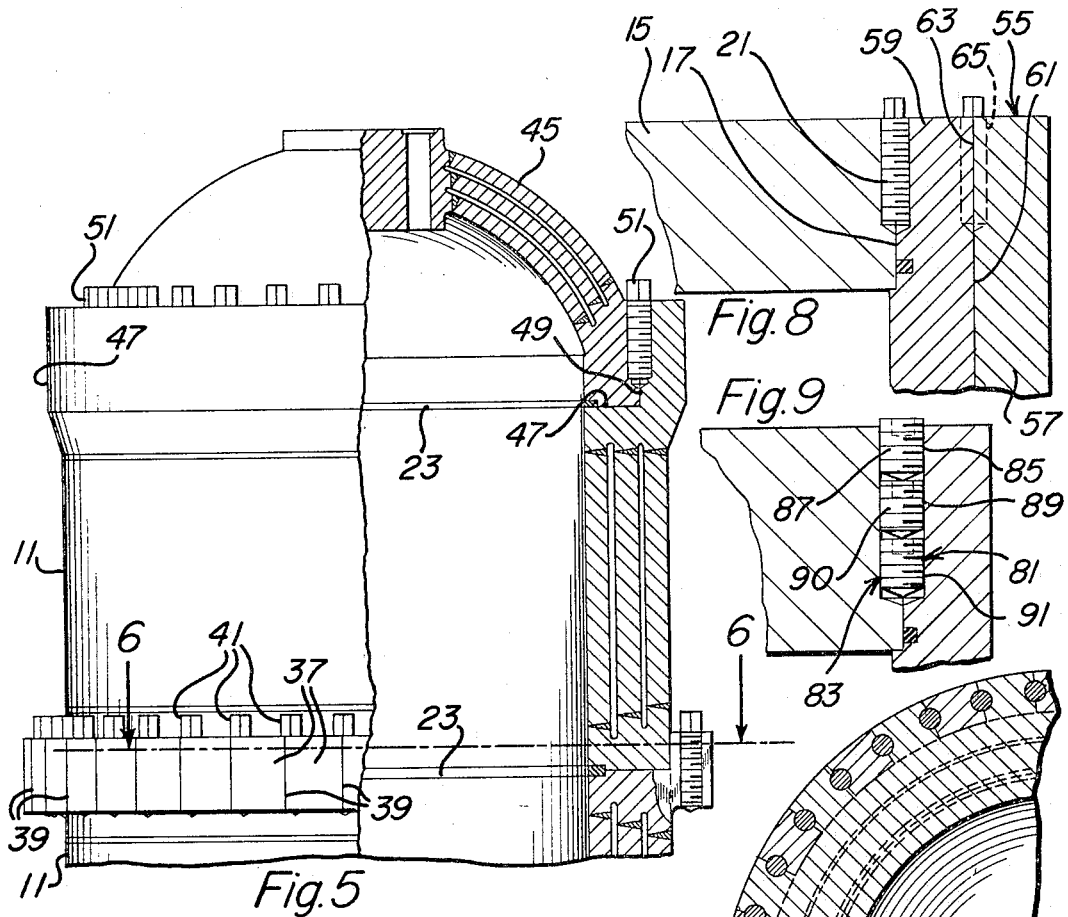
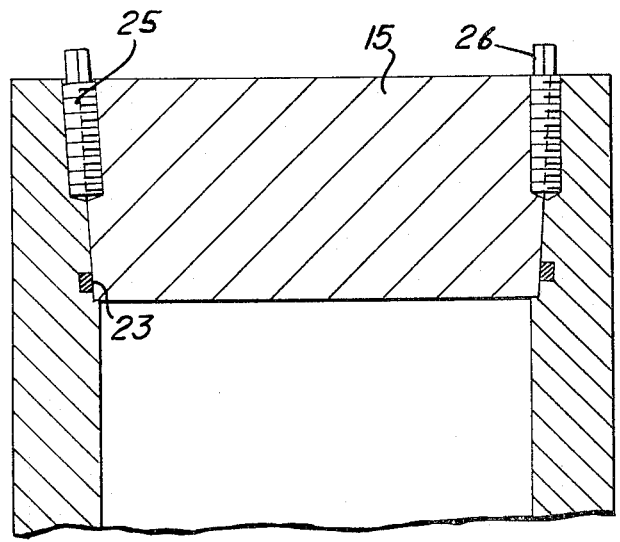
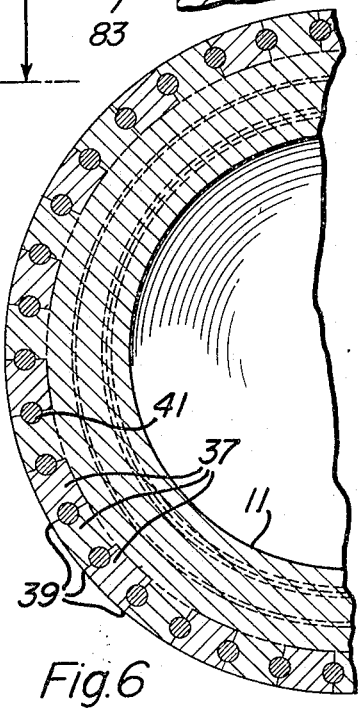
INVENTOR.
SVEND M. JORGENSEN
BY Martin Allen Farber
ATTORNEY

United States Patent Office 3,398,853
Patented Aug. 27, 1968

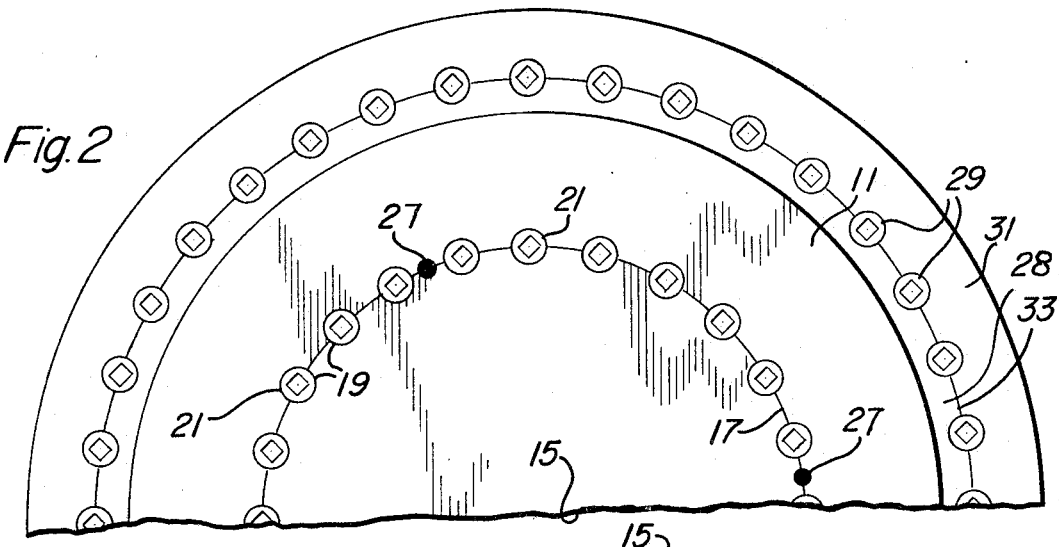
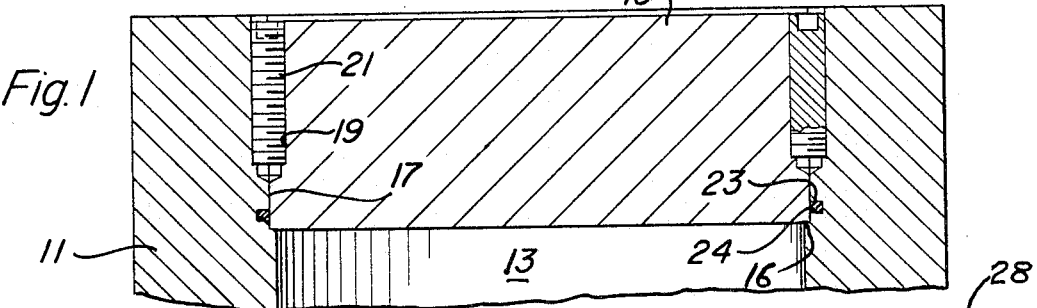
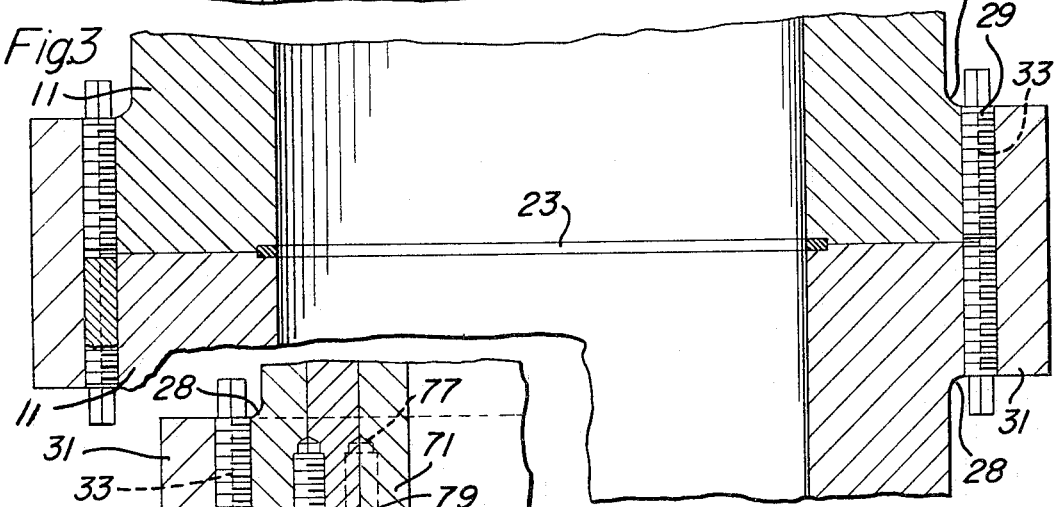
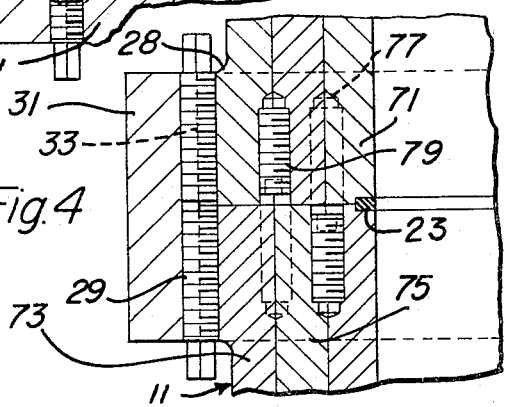

3,398,853
SHEAR STUD VESSEL CLOSURES AND SHELL JOINTS
Svend M. Jorgensen, Tenafly, N.J., assignor to Foster Wheeler Corporation, Livingston, N.J., a corporation of New York
Filed Apr. 13, 1966, Ser. No. 542,328
18 Claims. (Cl. 220—55)

ABSTRACT OF THE DISCLOSURE

A shear stud vessel closure and shell joint arrangement utilizing a plurality of threaded bolts at a closure or joint interface as a retaining means for the closure or joint and having a closure plug of outside dimensions larger than the inner dimensions of the vessel and smaller than the inner dimensions of the closure opening so that the plug fits within the opening and abuts upon a shoulder formed between the inner dimensions of the vessel and the closure opening.

---

Within industries employing process vessels like converters and reactors, larger units generally result in more economical production. For high pressure processes the vessel sizes are limited by the fabricator's facilities for lifting, handling and machining heavy units. With the appearance of new high tensile steels and new vessel types the vessel sizes, diameter and length, have been increasing slowly but steadily.

With the increase in size new problems have been encountered, among them the vessel closures. The great majority of process vessels require openings, often the full size of the vessel diameter. Practically the only closure employed is the conventional bolted flange unit, with stud bolts attached to a flange at the end of the vessel cylinder. For the larger sizes and higher pressures the bolted flange closure has reached its limit. The cost is disproportionately large compared with total vessel cost; its handling requires special equipment; and its size has become unmanageable. It is impractical and uneconomical beyond certain limits of size and/or pressure.

Other designs suggested as replacement for the bolted flange joint also are unsatisfactory. For example, the breech block closure, is a threaded plug closure which screws into mating grooves in the pressure vessel opening, primarily used in large gun closures. The principal drawback is that this closure requires machinery for making the large threads for the huge vessels required today which does not exist in most fabricators' shops, and which would require great capital expenditures. In addition, with breech block closures tolerance problems exist since the large mating threads on the plug and grooves in the pressure vessel have to be made by two different machines which may produce mating irregularities. Similarly, the shear block closure is not satisfactory, requiring large forgings and being bulky for large pressure vessels. Located at the end of the vessel, it is also a great disadvantage that the shear blocks and the opening mechanisms practically cover the whole outside surface of the closure since for process vessels this surface is used for product inlets and outlets, instrument connections, etc.

Accordingly, it is an object of the present invention to provide a better pressure vessel closure and shell joint than heretofore achieved which does not have the aforesaid disadvantages.

It is an object of the present invention to provide a high pressure vessel closure that does not require special machinery or bulky and expensive joints.

It is another object of the present invention to provide an improved and inexpensive closure for large and/or high pressure vessels.

It is another object of the present invention to provide an improved and economical pressure vessel closure for multilayer vessels.

It is still another object of the present invention to provide means for joining cylindrical sections, permitting field erection of vessels too large to be shipped and erected in one piece.

Therefore the present invention provides a unique and inexpensive pressure vessel closure comprising, a pressure vessel having an opening therein; a removable head inserted into the opening, said opening adapted on the inside diameter to receive the removable head in close fitting relationship defining an interface between the head and the pressure vessel, a plurality of drilled and tapped holes along the interface, each hole being partly in the head and partly in the pressure vessel wall, a threaded shear stud bolt inserted in each threaded hole to hold the head in the pressure vessel and withstand the hydrostatic load on the head due to the internal pressure.

With this shear stud bolt arrangement, a reliable and inexpensive closure is provided. The shear stud closure is simple and compact. Machinery required for its fabrication consists of a simple drill which is available in any vessel fabricating shop. A closure of close fitting tolerances is provided since the pitch of the threads and grooves in the stud holes in the interface of the head and pressure vessel is made with a single machine of standard thread series.

From the standpoint of cost no other vessel closure is as inexpensive and economical. It is rather unique in this respect, because the cost of the closure as a percentage of the total cost of a vessel becomes smaller as the pressure and pressure wall thickness increase, which is contrary to the case of the conventional type closures. Compared to the cost of a conventional flanged closure, the shear stud closure costs only a fraction thereof. The joint is especially advantageous for large, thick-walled vessels, as the joint does not appreciably add to the cost of the vessel.

The shear stud closure is a major advance in the art of pressure vessel closures which can be compared in importance to the introduction of the bolted flange itself. It has many applications in boiler vessels, feed water heaters, process vessels to mention but a few and in any application where high pressures and/or large vessels are required.

With large pressure vessels such as ammonia converters, for example, it is generally assumed that vessels of these sizes can not be designed with a removable closure of a size equal to the inner diameter of the vessel. Consequently, such vessels are designed with closed ends and a suitable number of openings for serving the internals. With the present invention an economical single vessel can be provided with a removable full size top closure permitting repair and field installation of liners, sheeting, catalyst supports, quenching coils and internal heat exchange equipment.

The shear stud closure also can be used for small vessels and openings. In manways, for instance, whether of the nozzle or pad type, they are equal to the conventional type, and much more economical, particularly for the flanged nozzle type, as it eliminates expensive forging, and consists entirely of a piece of pipe, closed by a plug cut from a rolled plate.

The shear stud invention is also applicable for connecting sections of pressure vessels thereby overcoming shipping and handling limitations since the joint is small and the vessel may be fabricated and shipped in sections and then readily joined at the site without requiring special machinery.

The shear stud may also be used to hold together the shells of a multilayer vessel. Here the studs are located between the interface of the vessel layers. In such vessels it may be desirable to transfer some of the longitudinal load from the inner to the outer shells, for example, in cases where the inner cylinder is insufficient to carry the work load, or to prevent sliding of the layers under operating pressure conditions. The shear stud conveniently performs this function.

The invention, these and other objects and advantages thereof should become apparent from a description of the invention in accordance with the drawings, in which:

FIGURE 1 is an elevation view of the interface plug closure of the present invention;

FIGURE 2 is a top view of the vessel of FIG. 1 and of FIG. 3;

FIGURE 3 is a sectional elevation view of the interface shell section joint of the present invention;

FIGURE 4 is an enlarged sectional view of a multilayer straight shell section joint;

FIGURE 5 is an elevation view of a pressure vessel showing an interface joint for a hemispherical closure and for a variant straight shell section joint;

FIGURE 6 is a plan view of the section joint taken along the line 6—6 of FIG. 5;

FIGURE 7 shows a conical interface plug closure of the present invention;

FIGURE 8 is a sectional view of an interface plug closure for a multilayer vessel; and FIGURE 9 shows a sectionalized stud which may be used with the invention.

Referring now to FIG. 1 for the shear stud closure of the invention, one end of pressure vessel 11 is shown having a cylindrical opening 13 therein constituting the interior of the vessel. To close the end of the vessel, a closure plug or head 15 in the shape of a flat solid disc machined to the dimensions of the opening 13 is inserted into the vessel opening resting on a shoulder 16 formed in the opening of the vessel 11. The head and the pressure vessel define a close fitting interface 17. A plurality of interface shear stud holes 19 are drilled in the head and vessel wall longitudinal to and along the interface. Each hole is partially in the head and partly in the vessel wall and the holes are spaced around the interface as shown in FIG. 2. The holes are drilled and threaded and studs 21, with mating threads, are inserted into the holes to hold the head in position against the internal pressure in the vessel interior. An O-ring seal 23 located in a groove 24 formed in the opening adjacent the head prevents leakage of fluid through the interface.

The interface forms an annular space between the head and vessel cylinder as a certain clearance is necessary to get the head into the opening depending on the tolerances of the opening and head. The annular space between the head and vessel unexpectedly was found not to cause any serious difficulties in the drilling and tapping of the interface holes. If desired, however, the size of the annular space can be brought down to practically any minimum desired by making the interface slightly conical as shown in FIG. 7. With a conical interface, the shear studs are angularly inclined either to the vertical or to the interface as illustrated by bolts 25 or 26, respectively.

For drilling, the head can be positioned by various methods. One method, is the initial drilling of three dowel pin holes in the interface about the circumference thereof in which are inserted dowel pins 27 to fix the head with respect to the vessel for drilling the interface shear stud holes 19. The shoulder 16 determines the longitudinal positioning of the head in the vessel cylinder. Another method, not shown, combines both longitudinal and circumferential positioning by placing three bars welded to the top of the head, the bars extended to rest on machined areas on the cylinder end (determining the longitudinal positioning of the head), the extended bars and vessel wall 11 bored for dowel pins (determining the circumferential positioning of the head).

The drilling and tapping of each interface hole 19 is done with the same drill press and machinery simultaneously cutting into the head 15 and vessel 11 each cycle. In this manner the tolerance between the head and vessel in the interface holes is the same.

It should now be apparent that an advantage of this closure is that a close machining tolerance of head and vessel cylinder bore is not necessary as the annular interface space causes no difficulties in the drilling and tapping; however, a close tolerance is necessary in the machining of the dowel or guide pins 27 and the holes for the pins when used to position the head since the perfect matching of the threads and grooves in the shear studs 21 and interface holes 19 depends on the initial assembly of the head and cylinder and the locking together of the two parts before the assembly is set up for drilling and tapping.

Also, it is of importance that the head, after removal can be put back in the same exact position, so that the threads in the head and vessel of each interface hole 19 are properly matched. The limits of deviation must be within the limits of thread tolerances. This is accomplished by the dowel or guide pins 27 and longitudinal shoulder stops 16. For this reason, the stops must be machined or installed before the holes for the guide pins are bored. To align the interface holes 19 in the head with the corresponding portion of the holes 19 in the vessel after replacement of a head, the dowel holes (or the stud openings) are initially set at unequal angles about the interface so that only one readily determined position of the head with respect to the vessel will align the holes 19 with the corresponding halves in both the plug and vessel.

The interface holes 19 and the studs 21 and threads and grooves thereof are dimensioned to take the hydrostatic load on the head due to the internal pressure from within the vessel opening 13. The stud bolts 21 in the interface are of sufficient size and strength to hold the head in place, with a proper margin of safety, when the vessel is under full working pressure. Shear forces on the studs hold the head in the vessel against the internal pressure; considering the opposing forces on opposite sides of the studs, each shear stud is held half by the vessel 11 and half by the head 15. The determining stress in the studs is the shear stress in the longitudinal area through the centerline of the stud. Although not limited thereto, for large vessel closures, it is suggested to use stud sizes between 2" to 3" diameters inclusive as there is essentially no advantage in using larger sizes. The number of threads may conveniently correspond to standard thread series and the length of the studs may be kept to between four and five times the diameter of the studs. This will keep the tapping operation within standard shop practice and also keep the torque required to insert the studs within reasonable limits. The required number of studs, preferred dimensions, threading and materials, are selected so as to hold the head in position without shearing the studs. The circumference of the interface provides sufficient area for the disposition of enough shear studs to have a shear force to hold the plug in place for very high pressures.

The use of the interface shear stud of the invention is not limited exclusively to the attachment of a closure to the end of the vessel. Referring now to FIG. 3 for a shear stud application for axially joining two sections of the pressure vessel 11, the cylinder vessel 11 is formed with small flange upset ends 28 to provide spacing for the insertion of shear studs 29. A cylindrical ring 31 is slipped over the outside diameters of the flanges, and the interface 33 between ring 31 and flanges 28 is drilled and tapped to receive the shear studs 29. The thickness of the ring is made sufficient to take the longitudinal stresses in the cylinder wall. An O-ring seal 23 is provided between the sections to prevent leakage.

With this application of the shear stud joint for connecting cylindrical sections, shipping and handling limitations are extended permitting larger vessels to be fabricated and shipped in sections and then joined at the vessel site with the usual simple assembling tools. Furthermore the section joint does not add materially to the cost of the vessel, as the flange upset ends 28 are small, the joint being especially advantageous for large, thick-walled vessels. Although FIG. 2 illustrates the end closure of FIG. 1 and the section joint of FIG. 3 on one vessel it is apparent that either closure may be used alone as well as together on the same vessel.

As an alternate to using a ring 31, for connecting two cylinder sections, FIGS. 5 and 6 show the vessel cylinders 11 crenelated at the ends to be joined. When the two vessel sections 11 are pushed together the alternating crenelations or battlement projections 37 on each pressure vessel section match and fit together so as to form a number of narrow interfaces 39 which are drilled and tapped to receive shear studs 41. The length of the projections 37 need be only half the length of the outside ring 31 of FIG. 3.

FIG. 5 also shows a dome end closure 45. Vessel 11 is formed into an enlarged end shoulder portion 47 mating with the end of the dome 45 forming a longitudinal interface 49 which is drilled and tapped to receive shear studs 51 as in FIG. 1.

The shear stud closure of the invention is useful not only in solid wall vessels, but also in compound shells of two or more layers. The reason for pressure vessels of more than one layer is that high tensile steels of 100,000 p.s.i. ultimate tensile strength are available in thicknesses up to 6 inches. Many pressure vessels today range beyond 6 inches. FIGS. 8 and 4 show the invention for multilayer vessel closures, FIG. 8 being an end closure for a duplex vessel and FIG. 4, a joint between two vessel sections. In FIG. 8 a two layer vessel 55 is illustrated having an outer layer 57 and an inner layer 59 defining a layer interface 61 therebetween. A closure head 15 (as in FIG. 1) is held in place against the inner layer 59 by shear studs 21 in holes drilled and tapped about the interface 17 between the head and the inner layer. Between the inner and outer layer, layer interface holes are drilled and tapped at interface 63 of the layer interface 61 to receive shear studs 65 which prevent the outer layer from sliding relative the inner layer and transfer some of the longitudinal load from the inner layer 59 to the outer layer 57. This is desirable in cases where the inner cylinder is insufficient to carry the whole load due to being thin, or being of a lower strength material than the outer layer. Studs 21 for the head and inner layer interface 17, and studs 65 for the inner and outer layer interface 61 are offset (stud 65 being in dashed line while stud 21 is in full line) to provide greater strength. More than two layer vessels may also be used.

In FIG. 4, a three layer vessel is shown having inner shell 71, outer shell 73 and intermediate shell 75. Inner interface studs 77 are disposed between the inner and intermediate shells, and outer interface studs 79 between the outer and intermediate shells to hold the layers in place and transmit some of the pressure load to the outer shells. The outer shell 73 is formed with a small flanged end 28, about which a ring 31 (as in FIG. 3) is placed, the ring and flanged end defining an interface 33 through which holes are drilled and tapped to receive shear studs 29 which clamp and hold the vessel sections together. Here as in FIG. 8 the layer interface stud bolts 77 and 79 are offset for greater strength. Also offset are upper and lower vessel section stud bolts of corresponding layers.

FIG. 9 shows a shear stud bolt 81 sectioned into three parts aligned in tandem in an interface opening 83. This shear stud may be used with any of the arrangements heretofore described. The sectionalized shear stud permits ease of insertion into the interface opening, each section requiring only one-third of the torque to get it into position. For this purpose the opening may be wider at the end portion 85 (corresponding to shear stud section 87) than at the next deeper drill opening portion 89, and likewise, opening portion 89 wider than opening portion 91. The pitch of the sections may also be different.

The sequence of fabrication of the closure of FIG. 1 is as follows: First, face the end of the cylinder 11 and finish the bore. Then machine the head 15, inserting the head into the cylinder opening 13, resting it on shoulder 16. Next drill and ream one guide pin hole and insert the guide pin and then proceed with the other two guide pin holes and pins in the same manner. Finally, drill and tap to complete each shear stud hole; clean out the tapped hole and insert the shear stud 21 before moving to the next hole.

It should now be apparent that the shear stud bolt closure (and section joint) of the invention is a simple, lightweight joint which is cheaper than prior closures and joint sections, and is especially useful for large and/or high pressure vessels without requiring heavy special machinery. It is useful for pressure vessel ratings and process requirements over 30,000 p.s.i.g. and larger than six feet in diameter, as well as smaller vessels and lower pressure ratings.

Cost estimates have shown that the shear stud closure and section joint of the invention is a fraction of the cost (and weight) of the conventional bolted flange closure and section joint for the type of vessels contemplated for its use. Forgings are kept to a minimum if not eliminated entirely, adding to the reduced cost. For conventional flanged bolted closures the cost of the shear stud closure generally accounts for one-third to one-half of the total vessel cost. To appreciate this, compare the shear stud closure with a conventional flange bolt closure for a vessel having a three foot inner diameter and designed for 7,000 p.s.i.g. internal pressure. A shear stud closed vessel of this size with a 4" thick cylinder wall, and 12.75" thick heads would weight about 8,900 lbs. from the terminal 14.5" of the vessel from the head including the weight of the head and adjacent vessel portion. The corresponding weight of the end of a vessel with a conventional bolted flange closure is 23,700 lbs. including the weight of the head, the flange outer diameter here being 59" and the head 16.5" thick. It can readily be seen that the shear stud closure presents a considerable saving in weight. Furthermore, the flange material is all forged in the conventional bolted closure adding to the cost. Other conventional closures also are expensive compared to the shear stud closure of the invention.

Variations may be made in the described embodiments. For example other types of seals and longitudinal head positioners, may be used instead of O-ring seal 23 and shoulder 16, respectively. Also the interface holes and shear stud bolts between shell layers may be used with other types of closures than shown, simply as a means for holding multilayer vessels in place without the layers sliding with respect to one another. Further any number of layers may be used. The multilayer vessels may be closed with a semispherical head (similar to that of FIG. 5) although specifically illustrated with a plug closure in FIG. 8.

Although the invention has been described with respect to specific embodiments, many other variations within the spirit and scope of the invention as defined in the following claims will be apparent to those skilled in the art.

What is claimed is:

1. A pressure vessel connection for joining two shell sections comprising,
    two shell sections having end portions disposed in abutting relationship at the end portions,
    a jointure member disposed in abutting relationship to both shell sections adjacent the end portions defining an interface between the jointure member and the shell sections, a plurality of stud bolts disposed about the interface, each stud bolt screwed along its length along the interface to both the jointure member and at least one shell section, each shell section having screwed thereto at least some of said stud bolts.

2. A pressure vessel connection for joining two shell sections according to claim 1 wherein the abutting end portions define a common longitudinal axis, said interface and stud bolts oriented substantially parallel to the longitudinal axis thereby longitudinally holding the shell sections together in abutting relationship by shear forces exerted along the length of the stud bolts.

3. A pressure vessel connection for joining two shell sections according to claim 2 wherein each stud bolt is screwed to only one of the shell sections and the jointure member, further comprising a second stud bolt axially aligned and adjacent to each stud bolt and screwed to the jointure member and the other shell section.

4. A pressure vessel connection for joining two shell sections according to claim 1 further comprising a sealing means located adjacent the end portions for preventing leakage of fluid between the end portions.

5. A pressure vessel connection for joining two shell sections according to claim 4 wherein the end portions of the shell sections are substantially hollow cylinders having equal diameters, the end portions axially disposed in abutting relationship, said jointure member comprising, a ring disposed about the cylinders adjacent the end portions defining said interface between both cylinders and the ring, the cylinders having a small flange portion at the interface, the flange portion sufficient in size for the stud bolts to be disposed at said interface.

6. A pressure vessel connection for joining two shell sections according to claim 5 wherein the ring is cylindrical, the interface being cylindrical, said stud bolts oriented in a generally parallel direction to the axis of the hollow cylinders, the flange portion slightly larger than the radius of the stud bolts.

7. A pressure vessel connection for joining two shell sections according to claim 6 wherein each stud bolt is screwed to only one hollow cylinder and the ring at the interface, further comprising a second stud bolt axially aligned and adjacent to each stud bolt and screwed to the ring and the other hollow cylinder at the interface.

8. A pressure vessel connection for joining two multilayer shell sections according to claim 5 wherein each hollow cylinder shell section comprises,
    at least two adjacent cylindrical shell layers in close fitting relationship defining a layer interface therebetween,
    a plurality of layer interface stud bolts disposed about the layer interface, each layer interface stud bolt screwed along its length along the layer interface to both shell layers holding the shell layers in tight engagement.

9. A pressure vessel connection for joining two multilayer shell sections according to claim 8 wherein the layer interface stud bolts are oriented in a generally parallel direction to the axis of the shell sections, the ring and interface being cylindrical.

10. A pressure vessel connection for joining two multilayer shell sections according to claim 9 wherein the shell layers of each shell section correspond in diameters so that the layer interface of one shell section is cylindrically aligned with and corresponds to the layer interface of the other shell section, said layer interface stud bolts in one shell section circumferentially offset to the layer interface stud bolts in the other shell section.

11. A pressure vessel connection for joining two shell sections comprising,
    two shell sections having substantially cylindrical end portions of the same dimensions, the sections having an inner cylindrical surface and an outer surface, the outer surface adjacent the end portions formed into an alternating series of battlements extending beyond the end portions,
    said shell sections being axially disposed in abutting relationship at the end portions, the battlements of each shell section in alternating engagement with the battlements of the other shell section defining a plurality of battlement interfaces,
    a stud bolt disposed along each battlement interface screwed along its length to the adjacent battlements of each shell section.

12. A pressure vessel connection for joining two shell sections according to claim 11 wherein the stud bolts are oriented in a generally axial direction.

13. A pressure vessel closure comprising:
    a cylindrical vessel having a cylindrical opening at one end, the diameter of said cylindrical opening being slightly larger than the inner diameter of the cylindrical vessel forming a shoulder circumferentially about the interior of the cylindrical vessel;
    a cylindrical closure plug of a substantially constant diameter, the diameter of said cylindrical closure plug being larger than said inner diameter of said cylindrical vessel and smaller than the diameter of said cylindrical opening so that the cylindrical closure plug fits within the cylindrical opening and rests upon the shoulder, the outer circumferential surface of the closure plug and the inner circumferential surface of the cylindrical opening forming a closure interface;
    a plurality of stud bolts disposed about the closure interface, each stud bolt screwed along its length to both the closure plug and the vessel; and
    sealing means at the closure interface to seal the closure interface.

14. A pressure vessel closure according to claim 13 wherein each stud bolt includes sectionalized bolt portions arranged in tandem.

15. A pressure vessel closure according to claim 13 wherein the cylindrical closure plug includes a hemispherical portion extending away from the cylindrical vessel.

16. A pressure vessel closure according to claim 13 wherein the cylindrical vessel includes:
    at least two adjacent shell layers in a close fitting relationship defining a layer interface therebetween;
    the shell layers including an inner layer defining said opening; and
    a plurality of layer interface stud bolts disposed about the layer interface, each layer interface stud bolt screwed along its length to both shell layers along the layer interface holding the shell layers in tight engagement.

17. A pressure vessel closure according to claim 16 wherein the stud bolts and the layer interface stud bolts lie on different radial lines offset relative each other.

18. A pressure vessel closure comprising:
    a vessel having an opening therein, said vessel being substantially cylindrical, said opening being frustoconical;
    a frustoconical removable closure plug adapted to fit in the opening thereby defining an interface with the vessel;
    a plurality of stud bolts disposed about the interface to both the closure plug and the vessel to the closure plug to the vessel; and
    a sealing means between the closure plug and the shell for preventing fluid leakage through the interface.

References Cited

UNITED STATES PATENTS

| | | | |
|---|---|---|---|
| 2,903,152 | 9/1959 | Kuo | 220—46 |
| 3,128,001 | 4/1964 | Schmitz | 220—55 XR |
| 3,245,708 | 4/1966 | Kooistra | 292—256.71 |

THERON E. CONDON, *Primary Examiner.*

GEORGE T. HALL, *Assistant Examiner.*